US011822771B2

(12) United States Patent
Helvik et al.

(10) Patent No.: US 11,822,771 B2
(45) Date of Patent: Nov. 21, 2023

(54) STRUCTURING COMMUNICATION AND CONTENT FOR DETECTED ACTIVITY AREAS

(71) Applicant: Microsoft Technology Licensing, LLC, Redmond, WA (US)

(72) Inventors: Torbjørn Helvik, Oslo (NO); Andreas Eide, Oslo (NO); Kjetil Krogvig Bergstrand, Kolbotn (NO); Lene Christin Rydningen, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/363,997

(22) Filed: Jun. 30, 2021

(65) Prior Publication Data
US 2023/0004266 A1    Jan. 5, 2023

(51) Int. Cl.
G06F 3/0488    (2022.01)
G06F 3/0482    (2013.01)
G06F 16/9535   (2019.01)
G06F 3/0484    (2022.01)
G06F 16/906    (2019.01)
G06Q 10/10     (2023.01)

(52) U.S. Cl.
CPC .......... *G06F 3/0484* (2013.01); *G06F 16/906* (2019.01); *G06F 16/9535* (2019.01); *G06Q 10/103* (2013.01)

(58) Field of Classification Search
CPC ..... G06F 3/0484; G06F 3/0481; G06F 3/0482
See application file for complete search history.

(56) References Cited

U.S. PATENT DOCUMENTS 7,216,088 B1 *  5/2007  Chappel ........ G06Q 10/063118
                                                  705/7.17
8,423,394 B2 *  4/2013  Kogan .......... G06Q 10/063114
                                                  705/7.15
(Continued)

FOREIGN PATENT DOCUMENTS

AU    2015231165 A1    4/2016
CA    2358393 C        3/2013

OTHER PUBLICATIONS

Arnison, et al., "Virtual Teams: A Virtue for the Conventional Team", In Journal of Workplace Learning, vol. 14, Issue 4, Jun. 1, 2002, 13 Pages.

(Continued)

*Primary Examiner* — Jordany Nunez

(57) ABSTRACT

Techniques for detecting one or more focus areas of a user and structuring activities and content around the focus area(s) are disclosed. The activities of a user, the people associated with the activities, and/or the content associated with the activities are automatically inferred or detected based on the channels of collaboration associated with the focus area(s). Example channels of collaboration include, but are not limited to, electronic mail, instant messages, documents, and in-person and online meetings. Some or all of the activities, people, and/or content are grouped into one or more focus areas, where a focus area relates to an endeavor in which the user focuses on over a period of time. Some or all of the focus areas are presented to the user.

20 Claims, 13 Drawing Sheets

(56) References Cited

U.S. PATENT DOCUMENTS

| | | | | |
|---|---|---|---|---|
| 8,566,115 B2* | 10/2013 | Moore | G06F 21/6254 | 705/2 |
| 8,639,552 B1* | 1/2014 | Chen | G06Q 10/107 | 705/7.21 |
| 8,688,434 B1* | 4/2014 | Birnbaum | G06F 40/56 | 704/9 |
| 8,788,590 B2* | 7/2014 | Culver | G06Q 10/067 | 709/205 |
| 8,920,241 B2* | 12/2014 | Reville | A63F 13/428 | 345/157 |
| 8,949,736 B2* | 2/2015 | Balko | G06F 3/0488 | 715/790 |
| 9,459,692 B1* | 10/2016 | Li | G06T 7/248 | |
| 9,727,376 B1* | 8/2017 | Bills | G06Q 10/0631 | |
| 9,846,527 B2* | 12/2017 | Hull | G06Q 50/01 | |
| 10,042,940 B2* | 8/2018 | Agarwal | G06Q 10/00 | |
| 10,152,684 B2* | 12/2018 | Gouvernel | H04W 16/14 | |
| 10,374,987 B2* | 8/2019 | Pola | H04L 51/52 | |
| 10,409,832 B2* | 9/2019 | Rao | G06F 16/904 | |
| 10,438,172 B2* | 10/2019 | Rangan | G06Q 10/1095 | |
| 10,536,551 B2* | 1/2020 | Debald | G06F 3/0482 | |
| 10,552,465 B2* | 2/2020 | Kenthapadi | G06F 16/334 | |
| 10,679,192 B2* | 6/2020 | Khan | H04L 51/04 | |
| 10,684,752 B2* | 6/2020 | Snyder | G06Q 10/1093 | |
| 10,824,675 B2* | 11/2020 | Alonso | G06F 16/9024 | |
| 10,970,457 B2* | 4/2021 | Prakash | G06F 40/143 | |
| 10,992,772 B2* | 4/2021 | Lee | H04L 51/04 | |
| 11,107,020 B2* | 8/2021 | Faulkner | G06Q 10/10 | |
| 11,681,968 B2* | 6/2023 | Dhaygude | G06N 5/022 | 706/11 |
| 2002/0055868 A1* | 5/2002 | Dusevic | G06F 16/954 | 705/7.13 |
| 2006/0117264 A1* | 6/2006 | Beaton | G06Q 10/107 | 715/751 |
| 2007/0143169 A1* | 6/2007 | Grant | G06Q 10/063112 | 705/7.14 |
| 2009/0265604 A1* | 10/2009 | Howard | G06Q 10/10 | 709/204 |
| 2010/0004921 A1* | 1/2010 | Hufnagel | G06F 40/56 | 704/9 |
| 2010/0082745 A1* | 4/2010 | Davis | G06F 16/958 | 709/204 |
| 2010/0169146 A1* | 7/2010 | Hoyne | G06Q 10/109 | 705/7.21 |
| 2010/0287023 A1* | 11/2010 | Knobel | G06Q 10/06311 | 709/204 |
| 2011/0106892 A1* | 5/2011 | Nelson | G06Q 10/109 | 709/206 |
| 2011/0271220 A1* | 11/2011 | Remsberg | G06Q 10/06 | 715/772 |
| 2012/0130907 A1* | 5/2012 | Thompson | G06Q 10/103 | 705/301 |
| 2012/0143961 A1* | 6/2012 | Jonsson | G06Q 10/1093 | 709/206 |
| 2013/0073343 A1* | 3/2013 | Richardson | G06Q 10/06 | 705/7.38 |
| 2013/0179799 A1* | 7/2013 | Savage | G06Q 10/103 | 715/751 |
| 2014/0019187 A1* | 1/2014 | Olsen | G06Q 50/01 | 705/7.23 |
| 2014/0081685 A1* | 3/2014 | Thacker | G06F 16/2379 | 705/7.12 |
| 2014/0101149 A1* | 4/2014 | Winters | G06F 16/252 | 707/736 |
| 2014/0137003 A1* | 5/2014 | Peters | G06Q 10/107 | 715/758 |
| 2014/0208325 A1* | 7/2014 | Chen | G06Q 10/107 | 718/102 |
| 2014/0279628 A1 | 9/2014 | Straznitskas | | |
| 2014/0310608 A1* | 10/2014 | Snyder | G06Q 10/109 | 715/738 |
| 2015/0120577 A1 | 4/2015 | Lobo et al. | | |
| 2015/0188851 A1* | 7/2015 | Tomkins | H04L 51/02 | 709/206 |
| 2015/0206088 A1* | 7/2015 | Gouvernel | G06F 40/131 | 705/7.39 |
| 2015/0242091 A1 | 8/2015 | Lu et al. | | |
| 2015/0317073 A1* | 11/2015 | Hull | G06Q 50/01 | 715/753 |
| 2015/0324454 A1* | 11/2015 | Roberts | G06F 16/248 | 707/734 |
| 2016/0110313 A1* | 4/2016 | Prakash | G06F 30/00 | 715/202 |
| 2016/0224939 A1* | 8/2016 | Chen | G06Q 10/06311 | |
| 2016/0255139 A1* | 9/2016 | Rathod | H04L 67/10 | 709/203 |
| 2016/0323411 A1* | 11/2016 | Lee | G06Q 50/01 | |
| 2017/0083842 A1* | 3/2017 | Chen | G06Q 10/0635 | |
| 2017/0083843 A1* | 3/2017 | Chen | G06Q 10/06312 | |
| 2018/0129993 A1 | 5/2018 | Fowler et al. | | |
| 2018/0173389 A1* | 6/2018 | Hull | G06F 3/04847 | |
| 2018/0189739 A1 | 7/2018 | Kenthapadi et al. | | |
| 2018/0198884 A1* | 7/2018 | Debald | H04L 67/535 | |
| 2018/0203869 A1* | 7/2018 | Henriques | G06F 16/951 | |
| 2018/0225632 A1 | 8/2018 | Kenthapadi et al. | | |
| 2018/0330013 A1* | 11/2018 | Liden | G06Q 10/1095 | |
| 2018/0330310 A1 | 11/2018 | Murriner et al. | | |
| 2018/0365319 A1* | 12/2018 | Ghotbi | G06Q 50/01 | |
| 2018/0374027 A1 | 12/2018 | Sampath | | |
| 2019/0052701 A1* | 2/2019 | Rathod | H04L 67/535 | |
| 2019/0155870 A1* | 5/2019 | Prakash | G06F 40/103 | |
| 2019/0164108 A1* | 5/2019 | Chimka | G06Q 50/01 | |
| 2019/0303493 A1* | 10/2019 | Ekambaram | H04L 51/226 | |
| 2019/0364001 A1* | 11/2019 | Dotan-Cohen | G06Q 10/107 | |
| 2020/0004565 A1 | 1/2020 | Kulkarni et al. | | |
| 2020/0097601 A1* | 3/2020 | Han | G06F 16/288 | |
| 2020/0153930 A1* | 5/2020 | Debald | G06Q 10/10 | |
| 2020/0293975 A1* | 9/2020 | Faulkner | G06Q 10/06316 | |
| 2021/0149925 A1* | 5/2021 | Mann | G06F 16/252 | |
| 2021/0157806 A1* | 5/2021 | Haramati | G06F 40/186 | |
| 2021/0166196 A1* | 6/2021 | Lereya | G06F 40/186 | |
| 2021/0216937 A1* | 7/2021 | Dhaygude | G06N 20/00 | |
| 2022/0261066 A1* | 8/2022 | Dryer | G06F 3/04845 | |
| 2023/0004943 A1* | 1/2023 | Øhrn | G06Q 50/01 | |

OTHER PUBLICATIONS

Krebs, et al., "Virtual Teams and Group Member Dissimilarity: Consequences for the Development of Trust", In Journal of Small Group Research, vol. 37, Issue 6, Dec. 1, 2006, pp. 721-741.

"International Search Report and Written Opinion Issued in PCT Application No. PCT/US22/029725", dated Aug. 11, 2022, 13 Pages.

* cited by examiner

E = ENTITY
D = DOCUMENT
T = TASK
P = PROJECT
C = COMMUNICATION

– – – – – – – – CL1                ⋯⋯⋯⋯⋯⋯⋯ CL3

⋯⋯⋯⋯⋯⋯ CL2                — ⋅ ⋅ — ⋅ ⋅ — CL4

STRUCTURING COMMUNICATION AND CONTENT FOR DETECTED ACTIVITY AREAS

BACKGROUND

As the number of tasks, meetings, electronic communications, documents, and other responsibilities a person manages in a day continues to increase, it may be difficult to keep track of these activities as well as the content that relates to the activities. For example, organizing, finding, and viewing emails, online meetings, and documents, as well as tracking the status of various tasks, can be challenging. Typically, these functions are performed manually, and curating the data associated with the activities can be frustrating and time consuming. Additionally, it can be difficult and time consuming for a person to manage the data such that old or less relevant data is archived, and current data is monitored.

SUMMARY

Techniques for detecting one or more focus areas of a user and structuring activities and content around the focus area(s) are disclosed. In one embodiment, the activities, the people associated with the activities, and/or the content associated with the focus area(s) are automatically inferred or detected based on the channels of collaboration associated with the focus area(s), such as electronic mail ("email"), instant messages, documents, meetings, and the like. Some or all of the activity data that is associated with the activities is grouped into one or more focus areas, where a focus area relates to an endeavor in which a user focuses on over a period of time. A focus area can include one or more persons and content (collectively "focus data") that are related to the endeavor. In one embodiment, an endeavor is a collaboration with one or more other persons and includes several tasks, associated content, and communications. Example focus areas include, but are not limited to, product development of Product A, a kitchen renovation, Project B, and recruiting.

Any suitable type of focus data can be presented in a focus area. For example, focus data such as documents, meetings, tasks, and communications can be displayed in a focus area. In one aspect, the one or more focus areas are presented to a person as a feed that is updated in real-time, in substantially real-time, at selected times, and/or on demand. Thus, as the activity data (e.g., activities, people, and content) the user focuses on changes over time, the focus data included in a focus area changes as well (e.g., hourly, daily, on demand).

In one aspect, a method includes determining an endeavor that a user has focused on over a period of time, where the endeavor is associated with activity data (e.g., entities and content items) that is received, generated, referenced, and identified by the user. The relationships between the entities and the content items are determined and based on the relationships, a portion of the entities and the content items are clustered into one or more focus areas. The focus area(s) is populated with focus area data that includes all or a subset of the activity data related to that focus area. The focus area is presented or caused to be presented, and one or more updates are provided to the focus data in the focus area. The one or more updates change the focus data presented in the focus area.

In another aspect, a system includes a processing device and a storage device operably connected to the processing device. The storage device stores instructions, that when executed by the processing device, cause operations to be performed. The operations include determining one or more endeavors that a user has focused on over a period of time, each endeavor comprising entities and content items, and determining relationships between the entities and the content items. The entities and the content items are grouped into one or more focus areas. At least one focus area is populated with focus data that is associated with the entities and the content in that focus area. The plurality of focus areas is provided for presented or is caused to be provided for presented. One or more updates is provided to the focus data in at least one focus area. The one or more updates changes the focus data presented in the at least one focus area.

In yet another aspect, a method includes determining an endeavor that a user has focused on over a period of time, where the determining includes: analyzing activity data associated with one or more activities of the user to determine content items associated with the endeavor; detecting one or more people associated with the content items to determine one or more entities; and determining relationships between the entities and the content items. At least some of the entities and the content items are clustered into a focus area based on the relationships, and the focus area is populated with focus data associated with the entities and the content items that are clustered in the focus area. The focus area is presented or is caused be presented as a feed by providing one or more updates to the focus data in the focus area in real-time, in substantially real-time, at selected times, or on demand. The one or more updates changes the focus data presented in the focus area.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
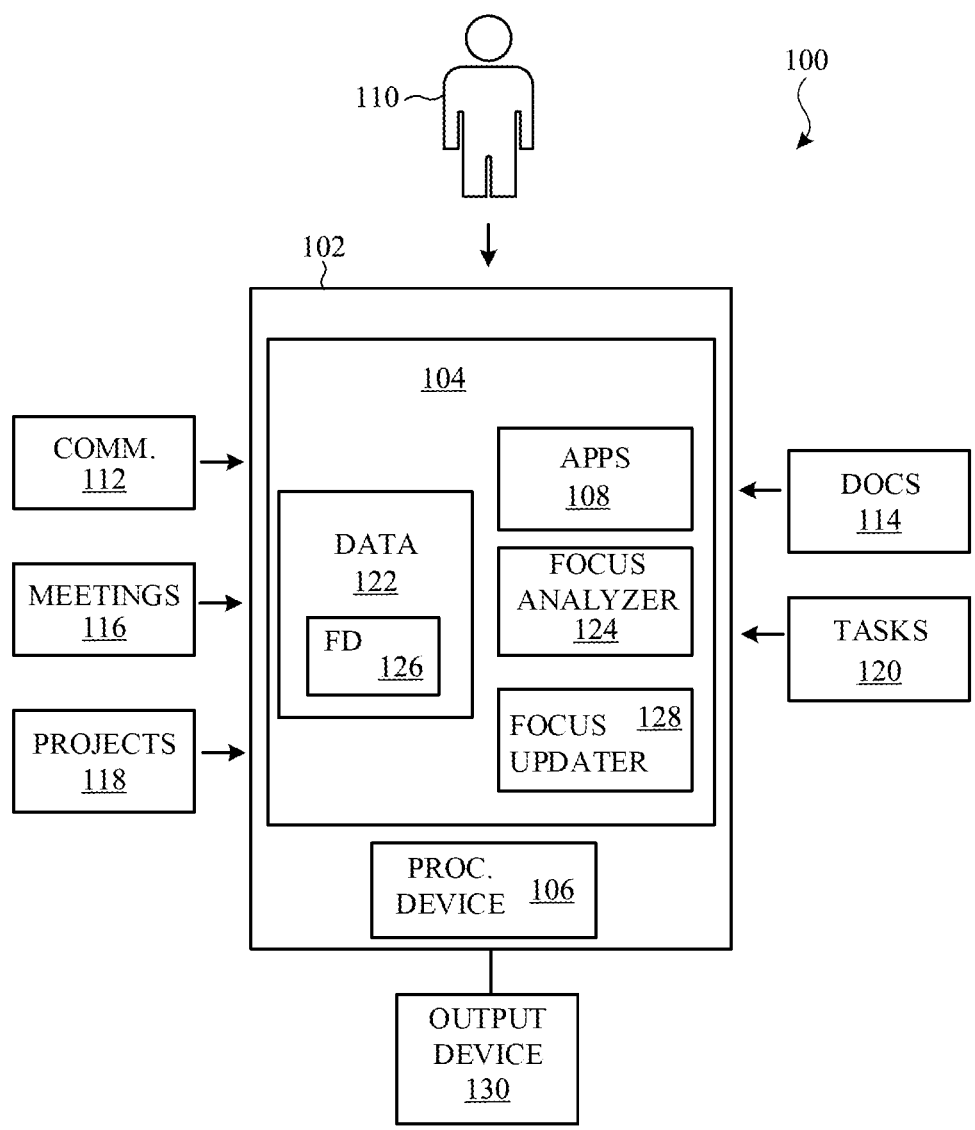
FIG. 1 illustrates a block diagram of a first system in which aspects of the present disclosure may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Generally, embodiments disclosed herein provide techniques for detecting one or more focus areas of a user and structuring activities and content around the focus area(s). In one embodiment, the user's activities, the people associated with the activities, and the content associated with the activities are automatically inferred or detected based on the channels of collaboration associated with the activities, such as electronic mail ("email"), instant messages, documents, meetings, and the like. For example, artificial intelligence or one or more machine learning mechanisms (e.g., models, algorithms, or applications) are used to infer the user's activities, the people associated with the activities, and the content associated with the activities. Some or all of this data ("activity data") is analyzed to determine one or more focus areas the user has focused on over a period of time. A focus area includes focus data, which is some or all of the activity data related to the focus area. Focus data such as documents, meetings, tasks, and communications can be presented in a focus area. Example communications include, but are not limited to, electronic mail ("email"), text messages, online chats, and instant messages. In one aspect, one or more focus areas are presented to the user as a feed that is updated in real-time, in substantially real-time, at predefined intervals, or on demand. Thus, as the activities, people, and content the user focuses on changes over time, the focus data included in a focus area changes as well (e.g., hourly, daily, or on demand).

Technical advantages of the disclosed embodiments include automatically assisting users in achieving goals, monitoring the statuses of activities, and completing the activities. Since the focus data in a focus area changes over time based on the user's activities and the content associated with the activities, the challenges of staying up to date on the various activities are reduced. The focus data is provided to a user in a manner that assists the user in visualizing the activities and accessing different workflows to the activities. Additionally or alternatively, the embodiments enable a user to quickly locate current content as well as older content that relate to a particular focus area.

FIG. 1 illustrates a block diagram of a first system in which aspects of the present disclosure may be practiced. The system 100 includes a computing device 102 that includes one or more storage devices (collectively referred to as storage device 104) and one or more processing devices (collectively referred to as processing device 106). The storage device 104 stores computer-executable instructions or one or more software applications 108. A user 110 interacts with the software application(s) to perform various actions. The actions can include sending, receiving, redirecting, creating, modifying, deleting, and viewing electronic communications 112. Example electronic communications include, but are not limited to, emails, text messages, instant messages, online chats, video messages, audio messages, and posts in social media.

The actions may further include creating, deleting, viewing, and/or editing documents 114, and organizing and/or attending in person and online meetings 116. Other actions can include working on, or managing one or more projects 118 and setting, modifying, deleting, monitoring, and/or completing tasks 120. Some of the tasks 120 may be related to or in advancement of the project(s) 118, while other tasks can be related to other business or personal actions.

These activities by the user 110 create, delete, and modify activity data 122. The activity data 122 includes data such as emails, various types of documents, meetings and other calendar information, contacts (people), text messages, and the like. As will be described in more detail later, a focus analyzer application 124 is operable to analyze the activity data 122 produced, received, and/or stored over a given period of time (the "focus time period") to generate one or more focus areas for the user 110. At least some of the activity data 122 associated with a particular endeavor is grouped into a focus area. The data associated with a generated focus area is stored in focus data 126.

The focus time period can be any suitable amount of time, such as a week, a month, or three months. The focus time period may be the same for each focus area or the time period for at least one focus area can differ from another focus area. As some focus areas will have shorter lifespans than other focus areas, each focus time period is adjustable. In some embodiments, the user 110 may set the amount of time for each focus time period or the user 110 can reset the focus time period after a focus area is generated.

A focus updater application 128 is operable to analyze the activity data 122 to determine select activity data to include in a focus area, where the select activity data is the focus data. For example, the focus data 126 can be the most recent (or more recent) activity data 122, important activity data 122, and/or the activity data 122 the user 110 spent the most time on during the focus time period. Additionally, the focus updater application 128 is operable to analyze the activity data 122 periodically, at selected times, and/or on demand to identify updates to the focus data 126 in one or more of the focus areas. In general, the focus updater application 128 analyzes the activity data 122 more frequently than the focus analyzer application 124. In one embodiment, the focus updater application 128 is operable to analyze the activity data 122 in real-time as the user 110 interacts with the computing device 102. In another embodiment, the focus updater application 128 is operable to analyze the data 122 at selected times to update the focus data 126.

The focus analyzer application 124 and the focus updater application 128 are implemented as one software application or as different software applications. In some embodiments, one or both of the focus analyzer application 124 and the focus updater application 128 include machine learning mechanisms (e.g., models, algorithms, or applications) that are adaptable over time. The focus analyzer application 124 and/or the focus updater application 128 learns over time and becomes more efficient and effective at generating focus areas and/or updating focus areas. The machine learning mechanism(s) learn over time based on the user's 110 interactions with the presentation of the focus areas, the user's 110 adjustments to the focus areas, adjustments to the focus data 126, adjustments to the activity data 122, and other types of user interactions.

In a non-limiting nonexclusive example, a topic the user 110 focuses on over a period of time is a task the user 110 is working on with two additional persons A and B. The user 110 and the persons A and B have exchanged electronic communications regarding the task. The user 110 has also created a document for the task and edited a second document that was produced by the person A. Thus, a focus area may be generated for the task that includes some or all of the electronic communications, the first document, the second document as well as the identities of the user 110, the person A, and the person B.

Some or all of the generated focus areas are provided to one or more output devices (collective referred to as output device 130). The output device 130 can be included in the computing device 102 or the output device 130 may be operably connected to the computing device 102. An example output device includes, but is not limited to, a display device, a speaker, a printer, and a display screen included or operably connected to a second computing device (e.g., a tablet, a mobile phone).

In one embodiment, the focus areas are presented to the user 110 based on the context of the user 110. The context of the user 110 is based on one or more factors. The application(s) the user has opened or is interacting with can be one factor. Another factor may be what actions the user is performing prior to or in parallel with the presentation of the focus areas. In a non-limiting nonexclusive example, the focus data in the focus areas is arranged into one view when the user 110 is working in one application, such as an email application. The same focus areas or different focus areas are arranged into another view when the user 110 is working in another application, such as a collaborative application.

The computing device 102 can be any suitable type of computing device. Example computing devices include a laptop computer, a tablet, a mobile telephone, a smart phone, a smart watch, a wearable computer, a desktop computer, a gaming device/computer (e.g., Xbox), a television, or a server computing device. These example computing devices are for example purposes only and should not be considered as limiting.

Figure 2:
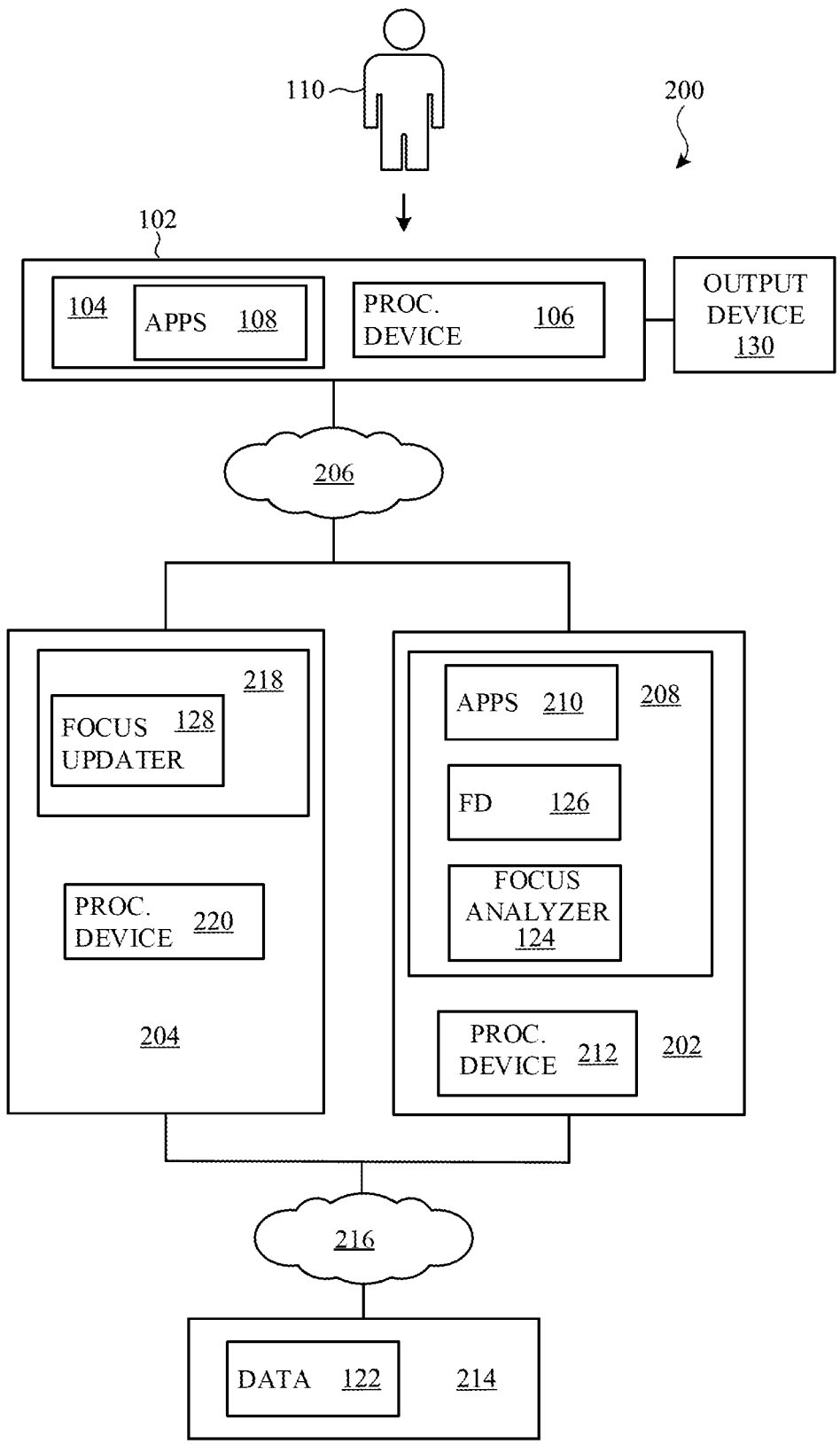
FIG. 2 illustrates a block diagram of a second system in which aspects of the present disclosure may be practiced.

FIG. 2 illustrates a block diagram of a second system in which aspects of the present disclosure may be practiced. The system 200 is a distributed system that includes the computing device 102, a second computing device 202, and a third computing device 204. The second and the third computing devices 202, 204 are each operably connected to the computing device 102 through one or more networks (collectively network 206).

The second computing device 202 includes one or more storage devices (collectively storage device 208) that stores applications 210 (e.g., at least some of the applications 108), the focus analyzer application 124, and the focus data 126. One or more processing devices (collectively processing device 212) are operable to execute the applications 210 and the focus analyzer application 124. One or more storage devices (storage device 214) are operably connected to the second computing device 202 and to the third computing device 204 through one or more networks (collectively network 216). The storage device 214 stores the activity data 122 that the focus analyzer application 124 and the focus updater application 128 analyze to generate the focus areas. Thus, during execution of the focus analyzer application 124, the focus analyzer application 124 is operable to access the activity data 122 over the network 216 to generate the focus areas.

The third computing device 204 includes one or more storage devices (collectively storage device 218) that store the focus updater application 128. One or more processing devices (collectively processing device 220) are operable to execute the focus updater application 128. The focus updater application 128 is operable to access the focus data 126 through the network 206 to update the focus data 126 in one or more of the focus areas. The focus updater application 128 is also operable to access the activity data 122 through the network 216 to analyze the activity data 122 and update the focus data 126 in one or more of the focus areas.

Networks 206, 216 are illustrative of any suitable type of network, for example, an intranet, and/or a distributed computing network (e.g., the Internet) over which the computing devices 102, 202, 204 may communicate with each other and with the storage devices 214. Additionally, the computing devices 202, 204 can each be any suitable computing device, such as a mobile telephone, a smart phone, a tablet, a smart watch, a wearable computer, a personal computer a desktop computer, a laptop computer, a gaming device/computer (e.g., Xbox), a television, or a server computing device. Although FIG. 2 depicts three computing devices 102, 202, 204 and one storage device 214, other embodiments are not limited to this configuration. The system 200 can include any suitable number of computing devices and/or storage devices.

Figure 3:
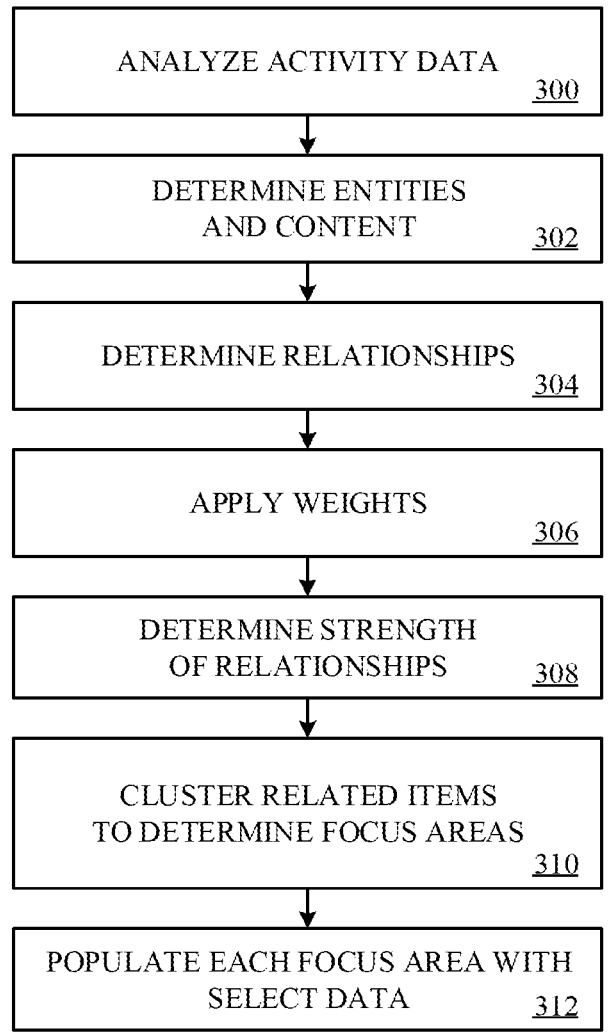
FIG. 3 illustrates a flowchart of a method of generating focus areas in accordance with some embodiments.

FIG. 3 illustrates a flowchart of a method of generating focus areas in accordance with some embodiments. Initially, as shown in block 300, the activity data associated with a user's activities (e.g., activity data 122 in FIG. 1), or with the user's activities and the activities associated with one or more other persons, over the focus time period is analyzed. As noted earlier, the focus time period can be any suitable time period, such as one minute, one hour, one week, or one month. One or more persons, businesses, organizations, and/or departments ("entities") and content are identified in the activity data at block 302.

The relationships between the content and the one or more entities identified at block 302 (e.g., person, document, email, organization, project) are determined at block 304. For example, when the user drafts, edits or views a document (e.g., an activity), a relationship exists between the user and the document. Relationships can also exist between the document and other persons who interacted with the document. Additionally, the document may have been prepared as part of a task or a project. Thus, a relationship exists between the document and the task or project.

Figure 4:
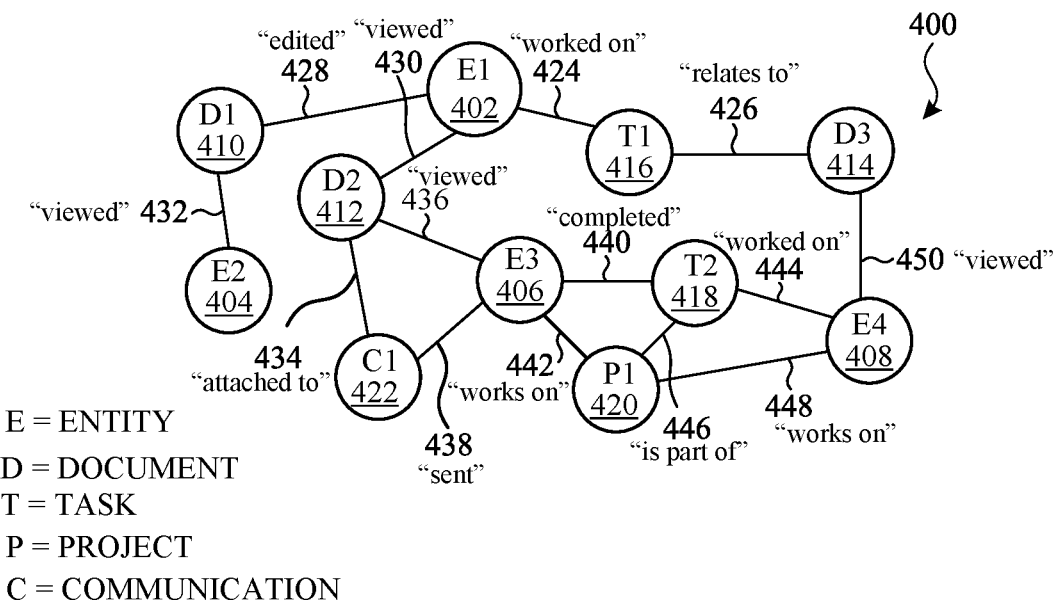
FIG. 4 illustrates an example node-edge graph in accordance with some embodiments.

In some embodiments, the operations in blocks 302 and 304 construct a graph, where the nodes in the graph represent items (e.g., a person, a document, an organization, an email, a project, etc.) and the edges represent relationships between the nodes. FIG. 4 illustrates an example node-edge graph in accordance with some embodiments. The example nodes represent entities (E), documents (D), communications (C), tasks (T), and projects (P). The node-edge graphs in other embodiments can include additional or different nodes.

Entities include persons, organizations, departments, and the like. Documents (D) include, but are not limited to, word processing documents, and spreadsheet documents, presentation documents, and transcripts of meetings. Communications (C) include emails, text messages, instant messages, and online chats. Tasks (T) include any suitable activities performed as part of a goal or a project. The work or completion of a task can produce documents, communications, and other data. The tasks further include activities such as in-person or online meetings, appointments, and events. Projects relate to the work or tasks that are directed at an objective (e.g., new product development).

As shown in FIG. 4, the node-edges graph 400 includes entity nodes 402, 404, 406, 408, document nodes 410, 412, 414, task nodes 416, 418, project node 420, and communication node 422. An edge 424 connects the node 402 to the node 416 and represents a relationship ("worked on") between the entity E1 and the task T1, where the entity E1 (e.g., a person) worked on the task T1. An edge 426 connects the node 414 to the node 416 and represents a relationship ("relates to") between the document D3 and the task T1, where the document D3 relates to the task T1. An edge 428 connects the node 402 to the node 410 and represents a relationship ("edited") between the entity E1 and the document D1, where the entity E1 edited the document D1. An edge 430 connects the node 402 to the node 412 and represents a relationship ("viewed") between the entity E1 and the document D2, where the entity E1 viewed the document D2. An edge 432 connects the node 404 to the node 410 and represents a relationship ("viewed") between the entity E2 and the document D1, where the entity E2 viewed the document D1. An edge 434 connects the node 412 to the node 422 and represents a relationship ("attached to") between the document D2 and the communication C1, where the document D2 is attached to the communication C1. An edge 436 connects the node 406 to the node 412 and represents a relationship ("viewed") between the entity E3 and the document D2, where the entity E3 viewed the document D2. An edge 438 connects the node 406 to the node 422 and represents a relationship ("sent") between the entity E3 and the communication C1, where the entity E3 sent the communication C1. An edge 440 connects the node 406 to the node 418 and represents a relationship ("completed") between the entity E3 and the task T2, where the entity E3 completed the task T2. An edge 442 connects the node 406 to the node 420 and represents a relationship ("works on") between the entity E3 and the project P1, where the entity E3 works on the project P1. An edge 444 connects the node 408 to the node 418 and represents a relationship ("worked on") between the entity E4 and the task T2, where the entity E4 worked on the task T2. An edge 446 connects the node 408 to the node 420 and represents a relationship ("is part of") between the task T2 and the project P1, where the task T2 is part of the project P1. An edge 448 connects the node 418 to the node 420 and represents a relationship ("works on") between the entity E4 and the project P1, where the entity E4 works on the project P1. An edge 450 connects the node 408 to the node 414 and represents a relationship ("viewed") between the entity E4 and the document D3, where the entity E4 viewed the document D3.

Next, as shown in block 306, one or more weights are applied to some or all of the nodes in the node-edge graph 400. In one embodiment, a weight captures the amount of attention, time, and effort the user spends, or is likely to spend on the item(s) represented by the node(s). Additionally or alternatively, a weight may represent how recently the user interacted with the item represented by the node. Generally, recent interactions can be assigned higher weights than older interactions.

The strengths of the relationships between the items (e.g., the nodes) are determined at block 308. Factors that can be considered when determining the strength of a relationship include, but are not limited to, the semantic similarity between the subject matter of the items represented by the nodes, the amount of time the user spent on the item represented by a node (e.g., how much time a user spent on a document), the recency of the interaction(s) with the items within the focus time period, the number of interactions, the people involved, and the subject matter of the communications and tasks (where related subject matter produces a stronger relationship). Another factor may be the number of overlaps between the people involved. For example, the higher the number of overlaps between E1 and E3 in FIG. 4 the stronger the relationship between the E1 and E3. For example, in FIG. 4, the entity E1 and the entity E3 both interacted with document D2, which is one overlap. In contrast, there are no overlaps between the entity E3 and the entity E4. Thus, the relationship between the entities E1, E3 may be stronger than the relationship between the entities E3, E4.

In embodiments that apply weights to the items (e.g., nodes) at block 306, the weights may impact the relationship strength considerations, where the weights can be positive or negative. A positive weight can be used to increase the strength of a relationship, while a negative weight can be used to decrease the strength of the relationship.

Additionally or alternatively, the temporal relationship between two items can be a factor. For example, if the entity E1 accesses document D1 and document D2 (FIG. 4) close in time, the temporal relationship between the accesses indicates the documents are related and the strength of the relationship between the two documents D1, D2 can be increased. Similarly, if the entity E1 accesses document D1 and document D2 (FIG. 4) farther apart in time, the temporal relationship indicates the documents may or may not be related and the strength of the relationship between the two documents D1, D2 can be reduced.

In some embodiments, the storage locations for the documents, the communications, and the data associated with the activities performed for the tasks and projects, as well as the storage locations of the data generated by the entities may be factors to consider. As one example, when the data is stored in the same storage location or in related storage locations, the strengths of the relationships between the data can be stronger compared to the relationships for data that is stored in separate or unassociated storage locations.

Referring again to FIG. 3, the items (e.g., the entities and the content) are grouped into one or more focus areas at block 310. In one example embodiment, the focus area(s) is formed based on topic modeling techniques that use people as the words. Additionally or alternatively, the one or more focus areas are formed using the people and select phrases or topics as the words.

In other embodiments, the one or more focus areas are formed using an algorithm or algorithms that find communities in a graph based on optimizing a quantity known as Newmans Modularity. Other embodiments can use additional or other techniques for forming the focus area(s).

In a non-limiting nonexclusive embodiment, N sets of people that the user works with on separate activities is determined, where N is any suitable number. Each set of people may include one or more people. For example, three (3) to ten (10) sets of people are detected in one embodiment. For each set of people, the activities performed by the user and the people in the set are determined. The activities can be the activities that the user or another person spent time on during the focus time period. Additionally or alternatively, a number of activities, select phrases and/or words in the data are determined. The activities, phrases, and/or words can be used to determine which data is related to particular focus areas (e.g., particular activities and/or content).

In some embodiments, the clustering is performed using embeddings that represent the people and the content (e.g., documents, emails). Since the embeddings are vectors, it is easier to apply further machine learning applications to the vectors, including clustering. For example, in one aspect a neural-net based clustering method is used to cluster the items (e.g., the nodes).

Figure 5:
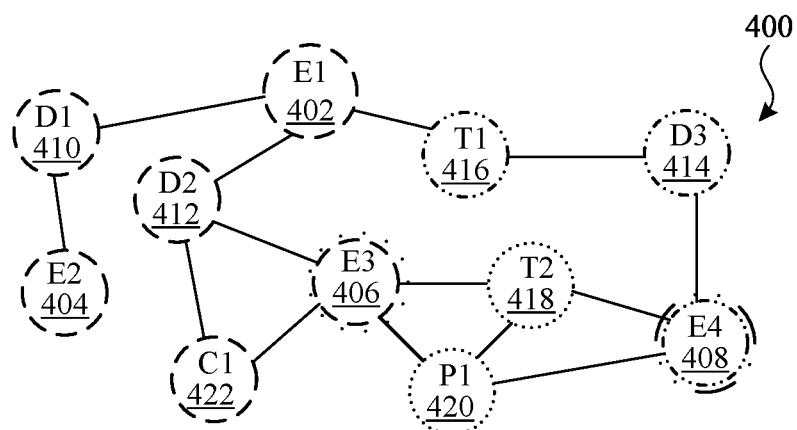
FIG. 5 illustrates clusters of nodes in the node-edge graph shown in FIG. 4 in accordance with some embodiments.

FIG. 5 illustrates clusters of nodes in the node-edge graph shown in FIG. 4 in accordance with some embodiments. The example node clusters are grouped into four clusters, CL1, CL2, CL3, and CL4. Each cluster CL1, CL2, CL3, and CL4 represents a focus area. Thus, in the illustrated example, there are four focus areas.

At block 312 in FIG. 3, the focus areas are then populated with data associated with the focus areas. In one embodiment, the focus updater application 128 in FIG. 1 detects the most recent, the important, and/or the time-consuming activities to be included in the focus areas. As discussed earlier, the focus areas in some embodiments operate as feeds where the data included in the focus areas is determined or updated in real-time or at selected times. Thus, block 312 repeats at certain intervals or at selected times in such embodiments.

Figure 6:
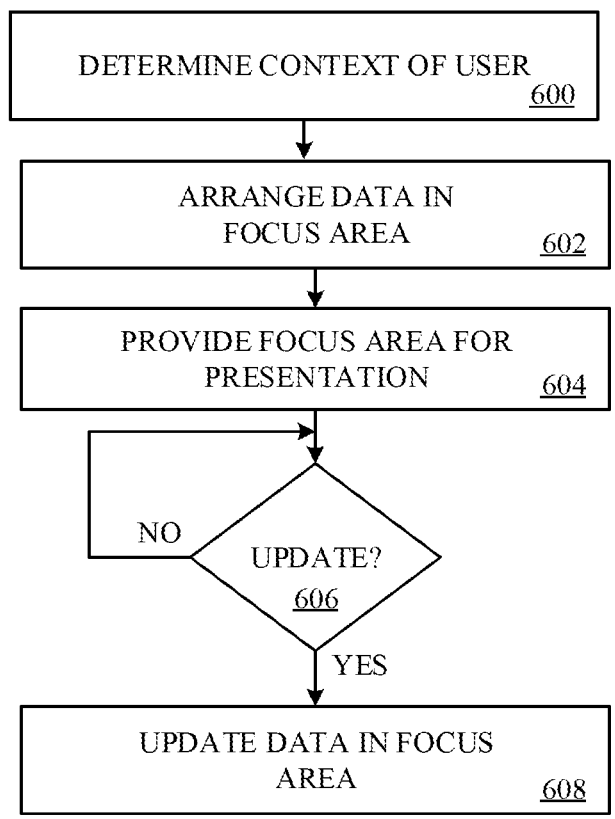
FIG. 6 illustrates a flowchart of a first method of presenting focus areas in accordance with some embodiments.

FIG. 6 illustrates a flowchart of a first method of presenting focus areas in accordance with some embodiments. Generally, the method shown in FIG. 6 is executed after the focus areas have been determined. FIG. 6 is described in conjunction with a current focus area. Other embodiments can identify and produce multiple focus areas.

Initially, as shown in block 600, a context of a user is determined. In one embodiment, the context is used to detect a current focus area the user is working on at the time. For example, the user can be drafting a document that is related to task A. The system may detect this based on the subject matter of the document, the storage location of the document, the person or people who have interacted with the document, and/or other factors associated with the document.

Next, as shown in block 602, the focus data for the current focus area is arranged in the focus area. In some instances, only a select amount of the focus data may be provided in the current focus area based on the available area in a GUI that will be used to display the focus area. Additionally or alternatively, the focus data in the top M activities may be presented, where M is a number that is greater than or equal to one. In some instances, the focus data presented in the current focus area is based on the application the user is using at the time. For example, if the user is drafting an email, one or more additional emails may be presented in the current focus area, where the one or more additional emails are associated with the current focus area and are emails that were drafted, received, forwarded, and/or replied to by the user.

At block 604, the current focus area is provided to one or more output devices for presentation. In one embodiment, the current focus area is displayed in the user interface of the software application open or launched at the time. A determination is made at block 606 as to whether the focus data in the current focus area is to be updated in the presentation.

The focus data can be updated based on several factors. First, the focus updater application 128 in FIG. 1 may have detected more recent activity data that is associated the focus area. Additionally or alternatively, a user can adjust or customize the focus data presented in the focus area. For example, a user can move (e.g., drag) focus data into the displayed focus area, or the user may remove or delete focus data from the focus area. In one embodiment, a user can delete focus data by selecting the focus data that is displayed in the focus area and selecting a delete menu option (see FIG. 7), or right-clicking on the focus data and selecting a delete option in a contextual menu to remove the focus data. As shown in FIG. 8, the user may select or deselect the subject matter to be considered when generating the focus areas or updating the focus areas. The selection or deselection of the subject matter can be performed, for example, in a settings menu.

If a determination is made at block 606 that the focus data in the current focus area will not be updated, the method waits at block 606. When a determination is made at block 606 that the focus data in the current focus area will be updated, the method continues at block 608 where the focus data is updated, which in turn modifies the focus data presented in the focus area.

Figure 7:
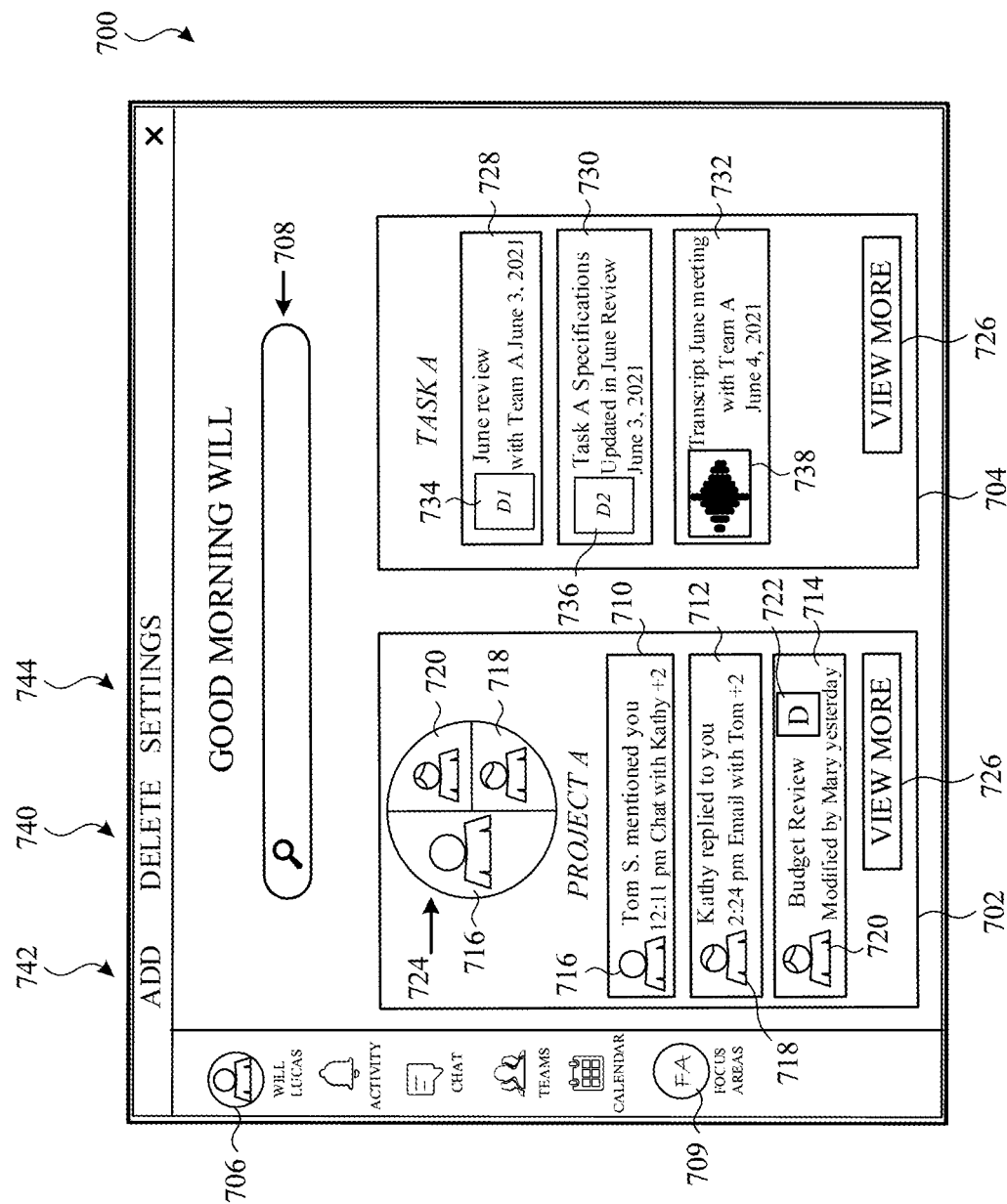
FIG. 7 illustrates an example GUI that presents focus areas in a first context in accordance with some embodiments.
Figure 8:
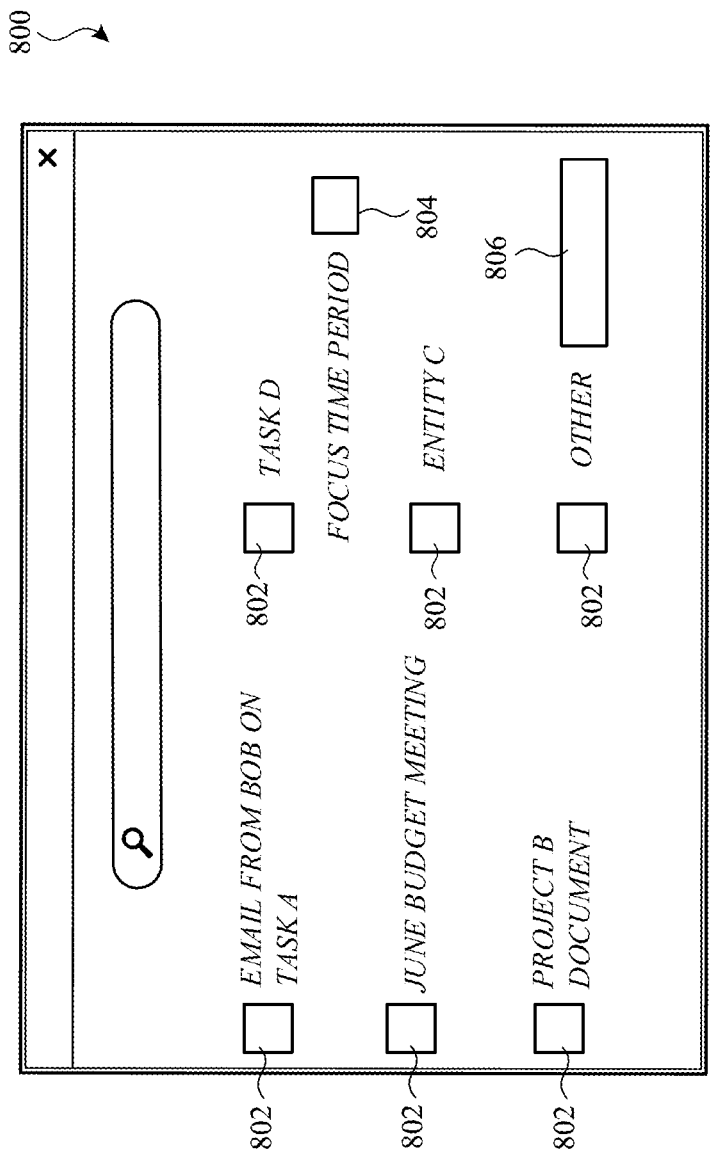
FIG. 8 illustrates an example GUI that enables a user to select data to be included in focus areas in accordance with some embodiments.

FIG. 7 illustrates an example GUI that presents focus areas in a first context in accordance with some embodiments. The GUI 700 is an example GUI of a collaborative application that presents two focus areas 702, 704. In one embodiment, the focus areas 702, 704 are displayed when the collaborative application is first launched. In other embodiments, the focus areas 702, 704 are presented when the user 706 enters the phrase "focus areas" in the search tool 708, searches for an item using the search tool 708 (e.g., Project A), and/or in response to the user 706 selecting the icon 709.

As discussed previously, the focus areas 702, 704 display focus data that relate to a particular endeavor of the user. In a non-limiting example, the focus data is the most recent (or more recent) activity data 122 (FIG. 1), important activity data 122, and/or the activity data 122 the user 110 spent the most time on during the focus time period. In the illustrated embodiment, the focus area 702 presents focus data associated with Project A and the focus area 704 displays focus data associated with Task A. The graphics 716, 718, and 720 may each be an image of the person or an image or representation (e.g., an avatar) selected by the person.

The focus data in the focus area 702 includes listings 710, 712, 714. Each listing 710, 712, 714 provides information on a recent activity that is associated with Project A. For example, the example listing 710 relates to a mention of the user 706 in a communication by the person 716 named Tom S. The communication can be an email, a text message, or an online chat. The listing 710 may provide additional information on the communication, including the date and/or time of the communication, select text in the communication that mentions or relates to the user 706 (e.g., "can you take a look at this . . . "), and/or additional people that are mentioned in or were recipients of the communication.

The listing 712 relates to a communication to the user 706 from the person 718 named Kathy. The listing 712 specifies the communication is a reply email that was received from Kathy at 2:24 pm. Tom and two other people (+2) also received the email.

The listing 714 relates to a document entitled "Budget Review" that is associated with Project A. The listing 714 specifies the document was modified by the person 720 ("Mary") yesterday. An icon 722 that represents the document is included in the listing 714. In some embodiments, the icon 722 is a link that when selected by the user 706, causes the document to open or causes presentation of the folder that stores the document.

The display of the focus area 702 provides an area 724 that displays graphics of the people 716, 718, 720 that are associated with the listings 710, 712, 714. In some embodiments, the graphics are links that when selected present information on the person. Example information includes, but is not limited to, a phone number, an email address, and/or the person's title or role on Project A. Additionally or alternatively, the area 724 can display the graphics of other or additional people, such as people working on Project A, or people the user 706 has recently interacted with in the focus time period.

The focus area 702 can also include an input element 726 that enables the user 706 to view more focus data related to Project A. The input element 726 can be any suitable type of input element, including, but not limited to, a button and a checkbox. When the input element 726 is selected, the focus area 702 can expand to include more focus data that is associated with Project A (e.g., see FIG. 10).

The focus area 704 presents focus data associated with Task A. The focus data in the focus area 704 includes listings 728, 730, 732. Each listing provides information on an activity (e.g., recent, important, and/or time intensive activity) that is associated with Task A. For example, the example listing 728 relates to a document entitled "June Review." The document can be a presentation, a word processing document, a spreadsheet, or any other suitable type of document. The representative listing 728 provides additional information on the document, including the date of the review (Jun. 3, 2021) and a group of people who participated in the review (Team A). An icon 734 that represents the document is included in the listing 728. In some embodiments, the icon 734 is a link to the document or to the storage location (e.g., the folder) of the document.

The listing 730 relates to document entitled "Task A Specifications." The listing 730 also indicates the document was updated on Jun. 3, 2021. In one embodiment, the activities in the listings 728, 730 are related as indicated by the reference to the June review in listing 730. The listing also includes an icon 736 that represents the document. In some embodiments, the icon 736 is a link to the document.

The listing 732 relates to a transcript of the June meeting. The example transcript is an audio transcript, but other embodiments are not limited to this type of transcript. In some embodiments, the transcript can be a written transcript. An icon 738 that represents the audio transcript is included in the listing 732. In some embodiments, the icon 738 is a link that when selected by the user 706, causes an audio player to open to play the audio transcript, or causes the presentation of the folder that stores the audio transcript.

As described previously, a user can adjust or customize the focus data presented in a focus area. For example, a user can move (e.g., drag) focus data into a displayed focus area (e.g., focus area 704), or into the GUI 700 to cause a focus area that provides related focus data to be presented. As shown in FIG. 7, a user may delete a listing and/or a focus area by selecting (e.g., clicking on) the listing or the focus area and selecting a delete menu option 740. Additionally or alternatively, the user can right-click on the listing, the focus area, and/or the GUI 700 and select a delete option that is presented in a contextual menu to delete the focus data. A user may add focus data (e.g., a listing and/or a focus area) by selecting an add menu option 742. A file explorer or other file management tool can be displayed to enable the user 706 to select the focus data to be added to the GUI 700.

A user may also select or deselect the activities and/or activity data to be considered when generating the focus areas or updating the focus areas. In FIG. 7, the user 706 can select the settings menu option 744 to cause a settings menu to be displayed. FIG. 8 illustrates an example GUI that enables a user to select data to be included in focus areas in accordance with some embodiments. The GUI 800 provides a user with a variety of activities and/or activity data to select for a focus area.

The representative activity includes Task D, and the illustrated activity data includes an Email from Bob on Task A, a June Budget Meeting, a Project B Document, and an Entity C (e.g., a person or enterprise). The GUI 800 also includes an "Other" option. Different and/or additional activities and/or activity data can be shown in other embodiments.

An input element 802 is provided for each activity or activity data. The input element 802 enables the user to select the activity or activity data that the user prefers for a focus area. In one embodiment, the selection of an activity or activity data does not guarantee that a focus area associated with the activity and/or activity data will be generated. Instead, the selection of the activity and/or activity data indicates the focus area associated with the activity or activity data is to be considered when the focus areas are generated. Each input element 802 can be any suitable type of input element, including a checkbox, a toggle switch, a drop-down menu, and a radio button.

The activity of "Task D" further includes an input element 804 that enables the user to set the amount of time for the focus time period for that activity. Like the input element 802, the input element 804 can be any suitable type of input element, including a drop-down menu and a text field. Although the input element 804 is only shown with "Task D" in FIG. 8, the input element 804 can be included with additional activities and/or activity data in other embodiments. Additionally or alternatively, the GUI 800 can include an input element 804 that enables the user to enter an amount of time that acts as a default focus time period for all of the activity(ies) and/or activity data.

When the input element 802 for "Other" is selected, a user is enabled to select an activity or a particular activity data using the input element 806. The input element 806 may be any suitable type of input element, including a drop-down menu and a text field. In some embodiments, selection of the input element 806 can cause a file explorer or other file management tool to be presented to enable the user to locate and select the activity data. Alternatively, the input element 806 may be a drop-down menu or other type of contextual menu that enables the user to select a software application to launch or open. Once open, the user may select the activity data through the GUI of the software application. For example, a user can select an email software application to open and then select one or more emails.

Figure 9:
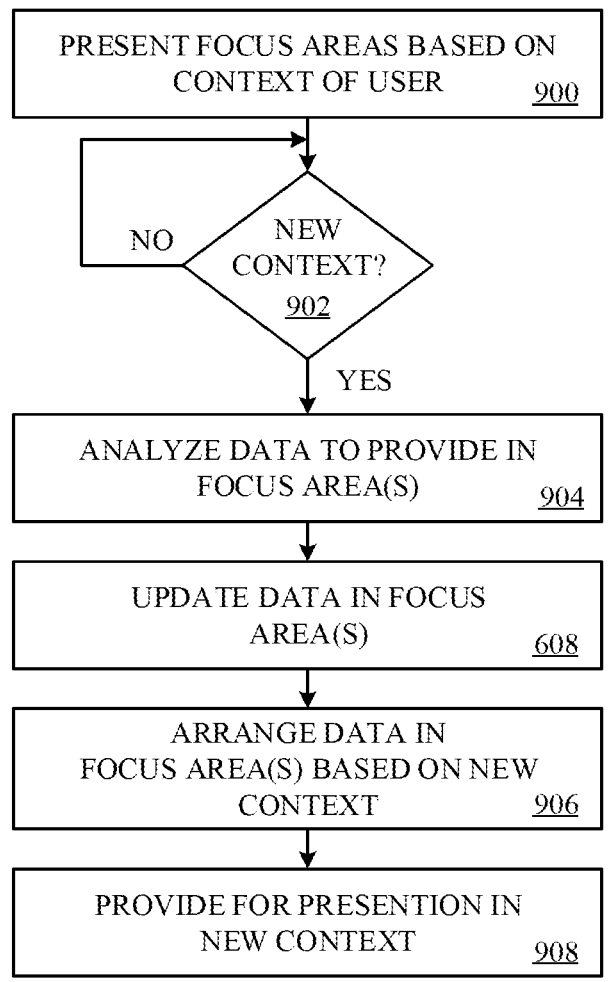
FIG. 9 illustrates a flowchart of a second method of presenting focus areas in accordance with some embodiments.

FIG. 9 illustrates a flowchart of a second method of presenting focus areas in accordance with some embodiments. As described earlier, the focus areas can be selected for presentation based on a context associated with the user. In some instances, the display of the focus areas is modified for a new context when the context changes. The method shown in FIG. 9 depicts an example method of presenting focus areas in different contexts.

Initially, as shown in block 900, one or more focus areas are arranged and presented based on a first context. As discussed earlier, the context is used to detect one or more current focus areas the user is working on at the time. A determination is made at block 902 as to whether the user is in, or is associated with, a new context. If not, the method waits at block 902. When a determination is made at block 902 that the user in a new context, the method continues at block 904 where the focus data (e.g., focus data 126 in FIG. 1) is analyzed to provide the focus data for the focus area(s) associated with the new context.

Next, as shown in block 906, the focus area(s) and the focus data within each focus area are arranged into a presentation. For example, only a select amount of the focus data may be provided in a focus area based on the available area in a GUI that will be used to display the focus area. Additionally or alternatively, the focus data in the top M activities may be presented, where M is a number that is greater than or equal to one. The one or more focus areas are provided to one or more output devices for presentation in the new context (block 908).

Figure 10:
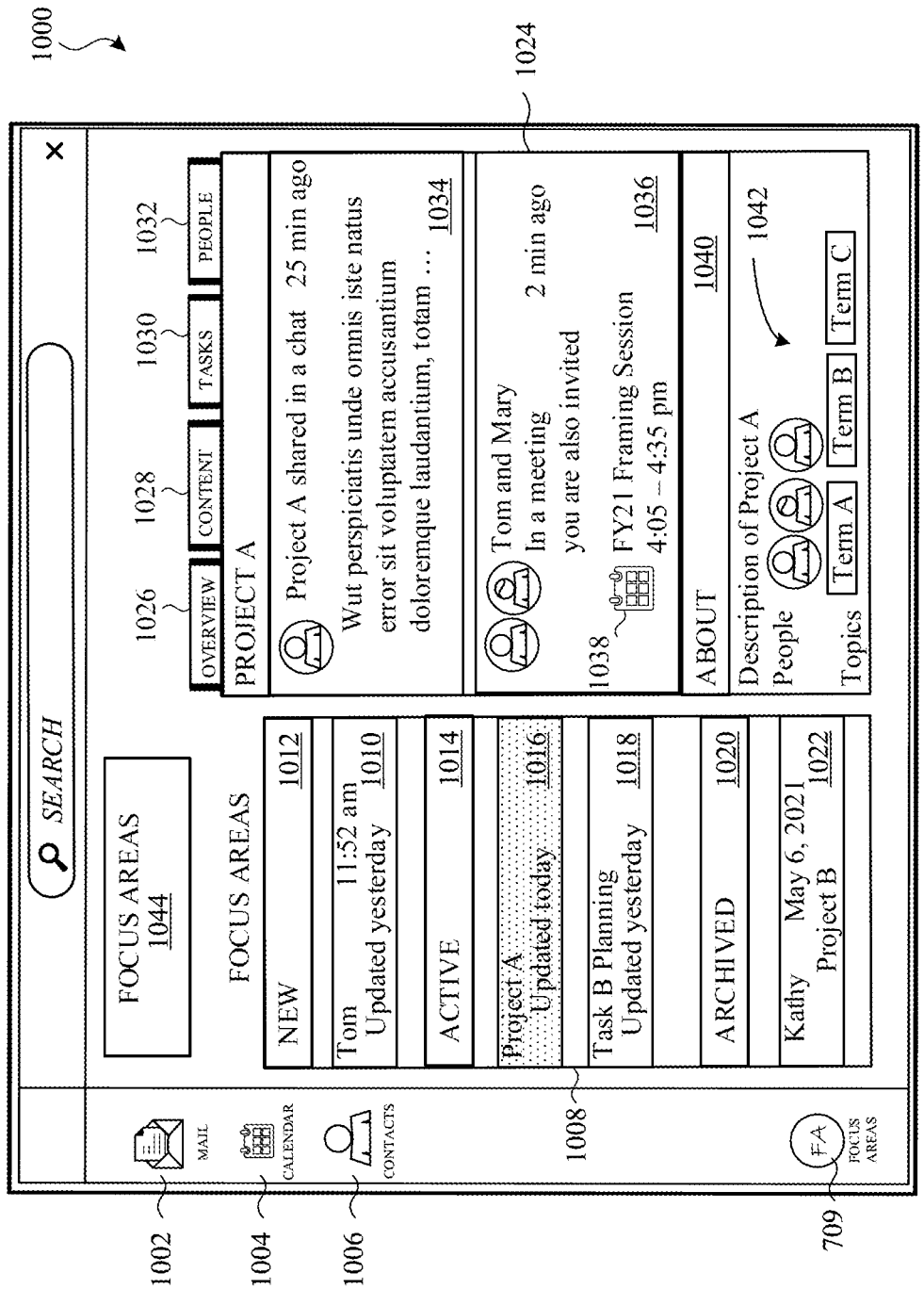
FIG. 10 illustrates an example GUI that presents one or more focus areas in accordance with some embodiments.

In some embodiments, the new context is based on a software application the user has opened or closed. FIG. 10 illustrates an example GUI that presents one or more focus areas in accordance with some embodiments. The example GUI 1000 is a personal information management software application that includes email 1002, a calendar 1004, and contacts 1006. The GUI 1000 presents several focus areas.

The panel 1008 displays a communication 1010 that is associated with a new focus area (section 1012). The section 1014 presents a document 1016 entitled Project A and a document 1018 entitled Task B Planning. The documents 1016, 1018 are associated with active focus areas, or the focus areas in which the user and/or other persons are currently working on and producing new activity data that may be included in the focus areas. The section 1020 displays a communication 1022 that has been archived. The communication 1022, as well as other types of data, may be archived based on one or more factors. Data can be archived based on how much time has passed since any person (e.g., the user) performed an activity that is associated with the focus area, the completion of a project or a task, and/or whether the user is no longer associated with the focus area (e.g., no longer working or a part of Project B). The archive section 1020 enables the user to find data in the focus areas that are no longer active. In one embodiment, the data associated with an archived focus area is stored in the focus data (e.g., focus data 126 in FIG. 1). The length of time in which the data in the archived focus areas is stored can be selected by a user, may be a default amount of time, or can be based on a data storage compliance policy.

A panel 1024 in the GUI 1000 is used to present additional focus data about a particular focus area. The panel 1024 includes one or more tabs that are used to organize the focus data. In the illustrated embodiment, the panel 1024 includes an Overview tab 1026, a Content tab 1028, a Tasks tab 1030, and a People tab 1032. When the Overview tab 1026 is selected (as shown in FIG. 10), the panel 1024 presents an overview of recent activities that are associated with Project A. For example, the document 1016 in the panel 1008 is selected, as indicated by the dotted box. In response to the selection of the document 1016, additional focus data about Project A is presented in the panel 1024.

The Overview includes a listing 1034 for an online chat related to Project A (and referenced in the listing 1016). The listing can include information such as the date and time of the chat and the participants in the chat. The illustrated information includes an excerpt of the chat to provide the user with a brief overview of the subject matter of the chat.

A listing 1036 for a meeting related to Project A is also displayed in the panel 1024. The information in the listing 1036 specifies the title of the meeting, the time of the meeting, the people in the meeting, and that the user is also invited to the meeting. A link 1038 to a calendar invite or calendar software application is attached to the listing 1036.

The Content tab 1028, when selected, can display different types of recent content that is associated with Project A. The content can include documents, communications, and the like. Different tasks associated with Project A are presented in the panel 1024 when the Tasks tab 1030 is selected. The people associated with Project A are displayed in the panel 1024 when the People tab 1032 is selected. In some embodiments, information for the people is also displayed, such as phone numbers, email addresses, and the function or title of the person on Project A.

The panel 1024 can also present a section 1040 that provides information about Project A. In the illustrated embodiment, the information includes a description of Project A, the people associated with Project A, and one or more terms 1042 for Project A. The terms "Term A", "Term B", and "Term C" can be used to review the activity data (e.g., activity data 122 in FIG. 1) when generating and/or updating the focus areas. In some instances, a user can edit the terms to add or delete terms via the section 1040. For example, a user can type in a new term into the section 1040.

In other embodiments, instead of displaying the panels 1008, 1024, the GUI 1000 can present less information for the focus areas, or can display the icon 709 or a small panel 1044 that the user can select to cause some or all of the panels 1008, 1024 to be displayed. As noted earlier, the arrangement of the focus areas, the amount of focus data provided in each focus area, and amount of space used in the GUI to present the focus areas can be based on the context of the user.

Figure 11:
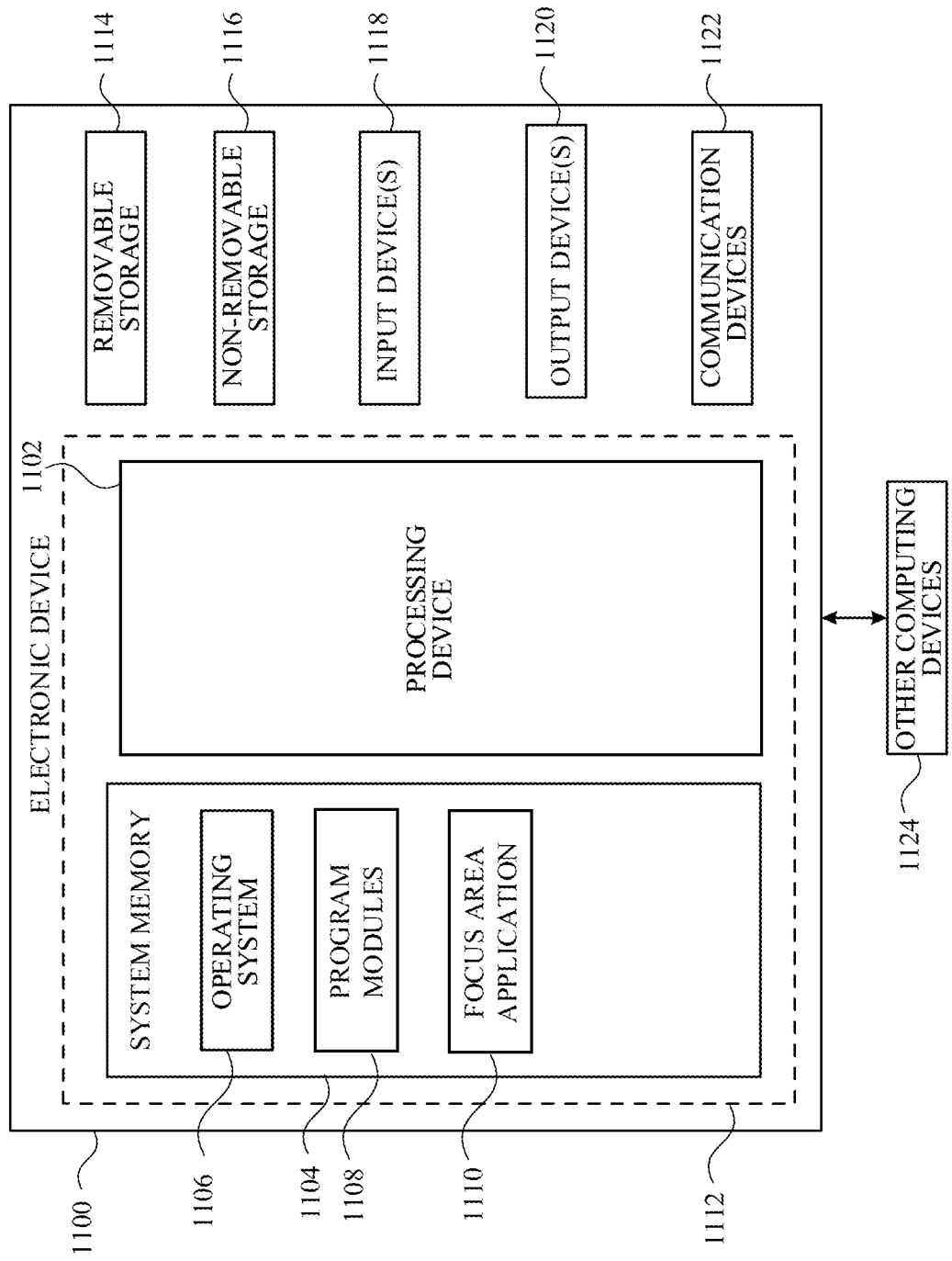
FIG. 11 illustrates a block diagram depicting example physical components of a computing device with which aspects of the disclosure may be practiced.
Figure 12A:
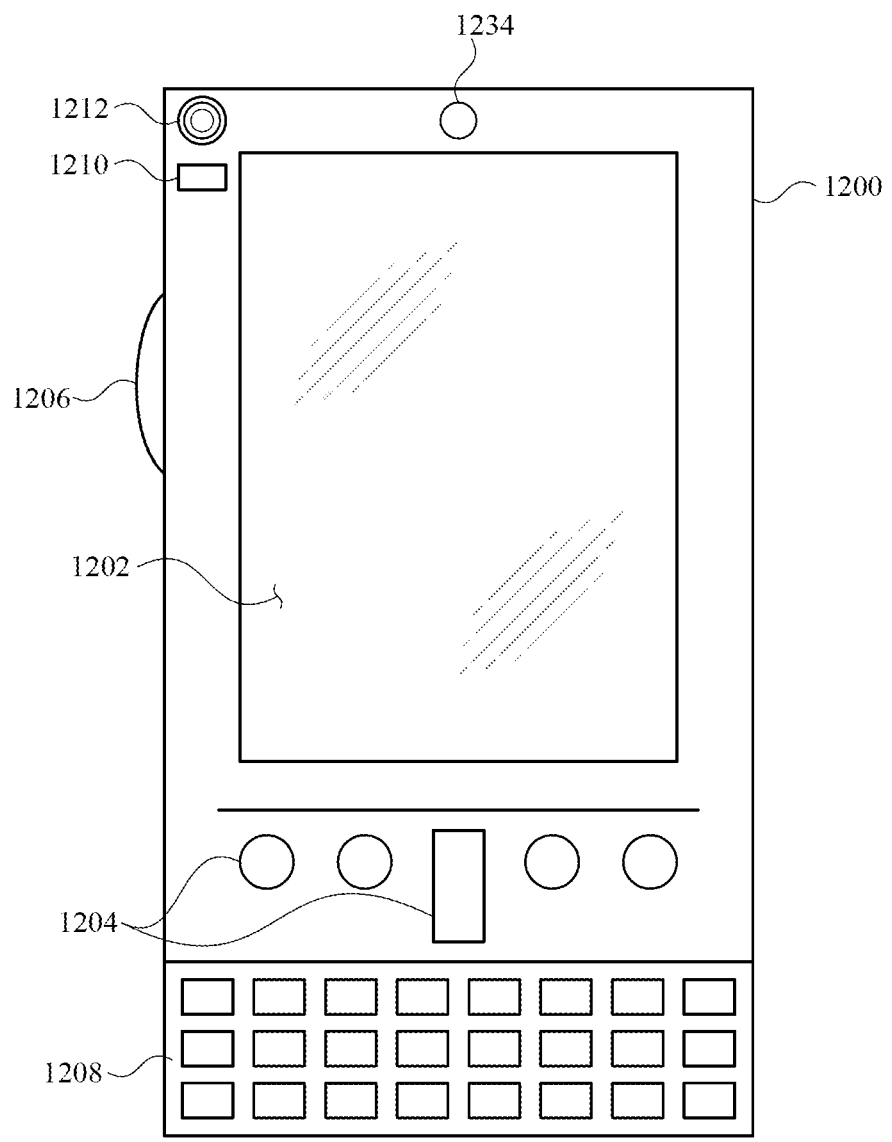
FIGS. 12A-12B illustrate block diagrams illustrating a mobile computing device with which aspects of the present disclosure may be practiced.
Figure 12B:
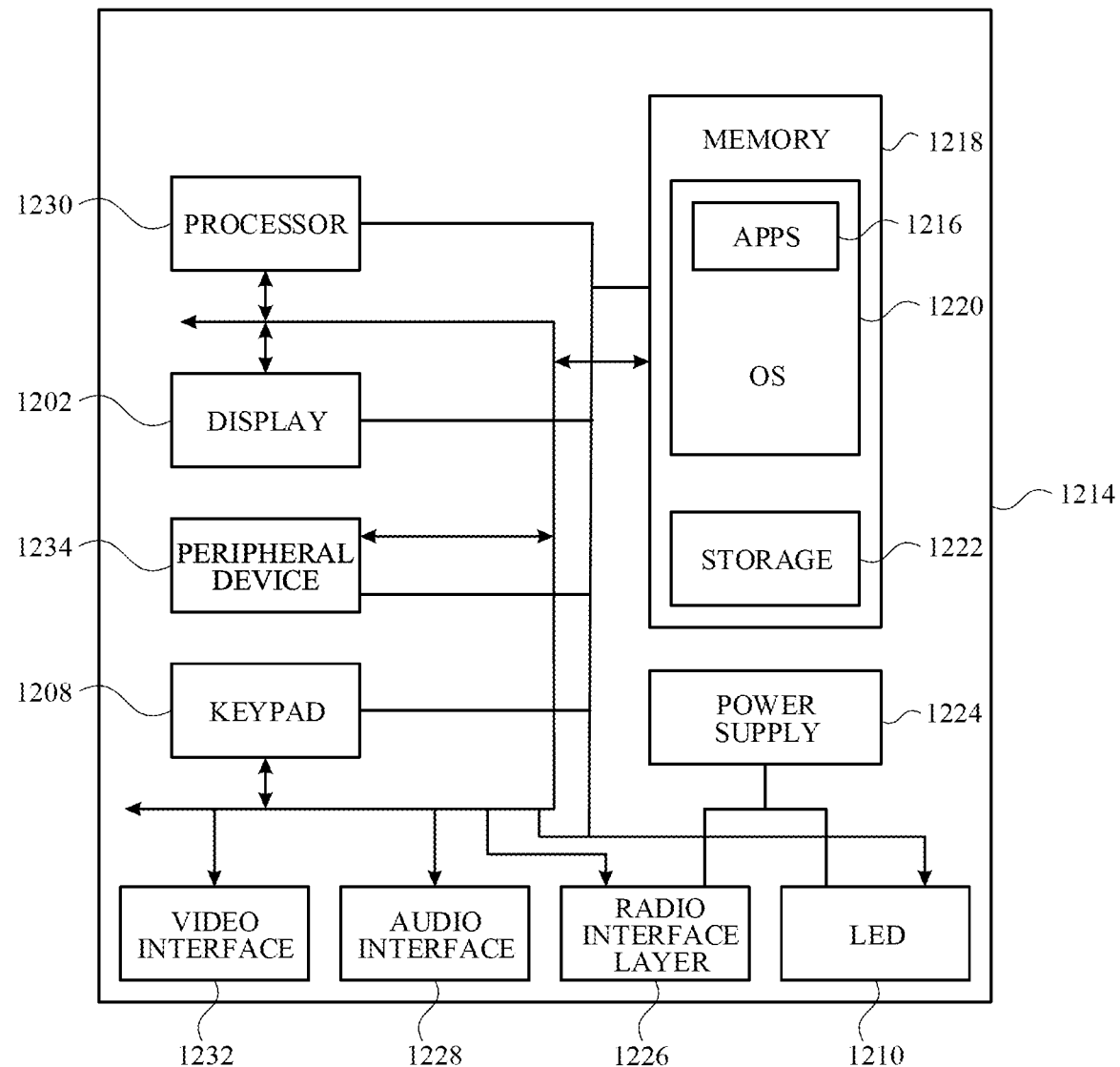
Figure 13:
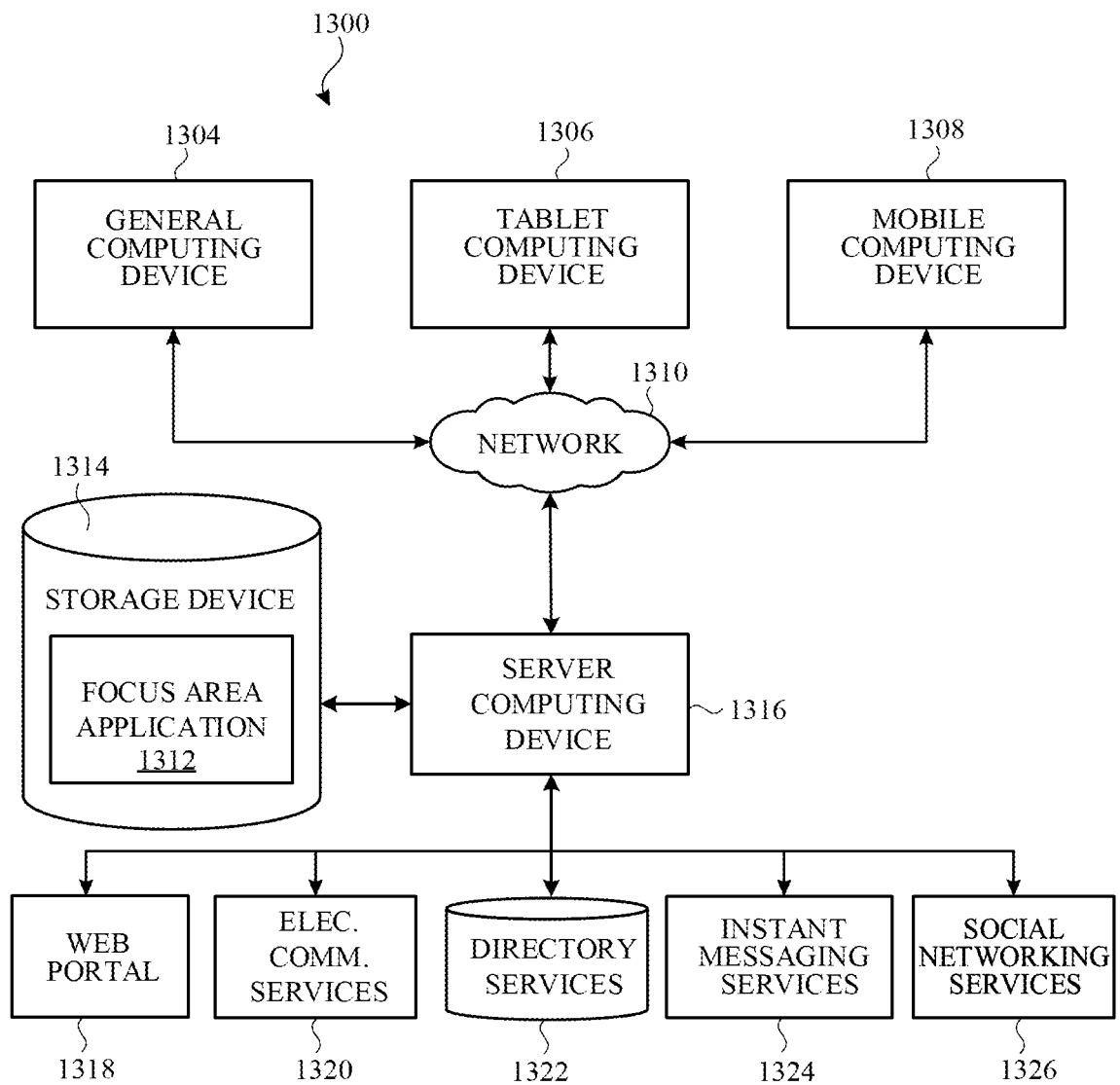
FIG. 13 illustrates a block diagram of a distributed computing system in which aspects of the present disclosure may be practiced.

FIGS. 11-13 and the associated descriptions provide a discussion of a variety of operating environments in which aspects of the disclosure may be practiced. However, the devices and systems illustrated and discussed with respect to FIGS. 11-13 are for purposes of example and illustration and are not limiting of a vast number of electronic device configurations that may be utilize for practicing aspects of the disclosure, as described herein.

FIG. 13 is a block diagram illustrating physical components (e.g., hardware) of an electronic device with which aspects of the disclosure may be practiced. In a basic configuration, the electronic device 1100 may include at least one processing device 1102 and a memory 1104. Any suitable processing device 1102 can be used. For example, the processing device 1102 may be a microprocessor, an application specific integrated circuit, a field programmable gate array, or combinations thereof.

Depending on the configuration and type of the electronic device 1100, the memory 1104 may comprise, but is not limited to, volatile storage (e.g., random access memory), non-volatile storage (e.g., read-only memory), flash memory, or any combination of such memories. The memory 1104 may include a number of program modules and data files, such as an operating system 1106, program modules 1108, and a focus area software application 1110. While executing on the processing device 1102, the focus area software application 1110 may perform and/or cause to be performed processes including, but not limited to, the aspects as described herein.

The operating system 1106, for example, may be suitable for controlling the operation of the electronic device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1112.

The electronic device 1100 may have additional features or functionality. For example, the electronic device 1100 may also include additional data storage devices (removable and/or non-removable) such as, for example, magnetic disks, optical disks, or tape. Such additional storage is illustrated in FIG. 11 by a removable storage device 1114 and a non-removable storage device 1116.

The electronic device 1100 may also have one or more input device(s) 1118 such as a keyboard, a trackpad, a mouse, a pen, a sound or voice input device, a touch, force and/or swipe input device, etc. The output device(s) 1120 such as a display, speakers, a printer, etc. may also be included. The aforementioned devices are examples and others may be used. The electronic device 1100 may include one or more communication devices 1122 allowing communications with other electronic devices 1124. Examples of suitable communication devices 1122 include, but are not limited to, radio frequency (RF) transmitter, receiver, and/or transceiver circuitry; universal serial bus (USB), parallel, and/or serial ports.

The term computer-readable media as used herein may include storage media or devices. The storage media or devices may include volatile and nonvolatile, removable, and non-removable media implemented in any method or technology for storage of information, such as computer readable instructions, data structures, or program modules.

The memory 1104, the removable storage device 1114, and the non-removable storage device 1116 are all examples of storage devices. Each storage device may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1100. Any such storage device may be part of the electronic device 1100. In one embodiment, the storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein, with respect to the capability of client to switch protocols may be operated via application-specific logic integrated with other components of the electronic device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

FIGS. 12A-12B illustrate a mobile electronic device 1200, for example, a mobile telephone, a smart phone, wearable computer (such as a smart watch), a tablet computer, a laptop computer, and the like, with which embodiments of the disclosure may be practiced. With reference to FIG. 12A, one aspect of a mobile electronic device 1200 for implementing the aspects described herein is illustrated.

In a basic configuration, the mobile electronic device 1200 is a handheld computer having both input elements and output elements. The mobile electronic device 1200 typically includes a display 1202 and one or more input buttons 1204 that allow the user to enter information into the mobile electronic device 1200. The display 1202 of the mobile electronic device 1200 may also function as an input device (e.g., a display that accepts touch and/or force input).

If included, an optional side input element 1206 allows further user input. The side input element 1206 may be a rotary switch, a button, or any other type of manual input element. In alternative aspects, mobile electronic device 1200 may incorporate more or less input elements. For example, the display 1202 may not be a touch screen in some embodiments. In yet another alternative embodiment, the mobile electronic device 1200 is a portable phone system, such as a cellular phone. The mobile electronic device 1200 may also include an optional keypad 1208. Optional keypad 1208 may be a physical keypad or a "soft" keypad generated on the touch screen display.

In various embodiments, the output elements include the display 1202 for showing a graphical user interface (GUI) of a client or developer portal, a visual indicator 1210 (e.g., a light emitting diode), and/or an audio transducer 1212 (e.g., a speaker). In some aspects, the mobile electronic device 1200 incorporates a vibration transducer for providing the user with tactile feedback. In yet another aspect, the mobile electronic device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile electronic device 1200. That is, the mobile electronic device 1200 can incorporate a system (e.g., an architecture) 1214 to implement some aspects. In one embodiment, the system 1214 is implemented as a "smart phone" capable of running one or more applications (e.g., browser, email, calendaring, contact managers, messaging clients, games, media clients/players, diagramming, and sharing applications and so on). In some aspects, the system 1214 is integrated as an electronic device, such as an integrated personal digital assistant (PDA) and wireless phone.

One or more application programs 1216 may be loaded into the memory 1218 and run on or in association with the operating system 1220. Examples of the application programs include a phone dialer program, an electronic communication program (e.g., email program, instant message program), a triggering application program, a word processing program, a spreadsheet program, an Internet browser program, and so forth.

The system 1214 also includes a non-volatile storage area 1222 within the memory 1218. The non-volatile storage area 1222 may be used to store persistent information that should not be lost when the system 1214 is powered down.

The application programs 1216 may use and store information in the non-volatile storage area 1222, such as email, attachments or other messages used by an email application, and the like. A synchronization application (not shown) also resides on the system 1214 and is programmed to interact with a corresponding synchronization application resident on a host computer to keep the information stored in the non-volatile storage area 1222 synchronized with corresponding information stored at the host computer.

The system 1214 has a power supply 1224, which may be implemented as one or more batteries. The power supply 1224 may further include an external power source, such as an AC adapter or a powered docking cradle that supplements or recharges the batteries.

The system 1214 may also include a radio interface layer 1226 that performs the function of transmitting and receiving radio frequency communications. The radio interface layer 1226 facilitates wireless connectivity between the system 1214 and the "outside world," via a communications carrier or service provider. Transmissions to and from the radio interface layer 1226 are conducted under control of the operating system 1220. In other words, communications received by the radio interface layer 1226 may be disseminated to the application programs 1216 via the operating system 1220, and vice versa.

The visual indicator 1210 may be used to provide visual notifications, and/or an audio interface 1228 may be used for producing audible notifications via an audio transducer (e.g., audio transducer 1212 illustrated in FIG. 12A). In the illustrated embodiment, the visual indicator 1210 is a light emitting diode (LED) and the audio transducer 1212 may be a speaker. These devices may be directly coupled to the power supply 1224 so that when activated, they remain on for a duration dictated by the notification mechanism even though the processor 1230 and other components might shut down for conserving battery power. The LED may be programmed to remain on indefinitely until the user takes action to indicate the powered-on status of the device.

The audio interface 1228 is used to provide audible signals to and receive audible signals from the user (e.g., voice input such as described above). For example, in addition to being coupled to the audio transducer 1212, the audio interface 1228 may also be coupled to a microphone to receive audible input, such as to facilitate a telephone conversation.

The system 1214 may further include a video interface 1232 that enables an operation of peripheral device 1234 (e.g., on-board camera) to record still images, video stream, and the like.

A mobile electronic device 1200 implementing the system 1214 may have additional features or functionality. For example, the mobile electronic device 1200 may also include additional data storage devices (removable and/or non-removable) such as, magnetic disks, optical disks, or tape. Such additional storage is illustrated in FIG. 12B by the non-volatile storage area 1222.

Data/information generated or captured by the mobile electronic device 1200 and stored via the system 1214 may be stored locally on the mobile electronic device 1200, as described above, or the data may be stored on any number of storage media that may be accessed by the device via the radio interface layer 1226 or via a wired connection between the mobile electronic device 1200 and a separate electronic device associated with the mobile electronic device 1200, for example, a server-computing device in a distributed computing network, such as the Internet (e.g., server computing device 1318 in FIG. 13). As should be appreciated such data/information may be accessed via the mobile electronic device 1200 via the radio interface layer 1226 or via a distributed computing network. Similarly, such data/information may be readily transferred between electronic devices for storage and use according to well-known data/information transfer and storage means, including email and collaborative data/information sharing systems.

As should be appreciated, FIG. 12A and FIG. 12B are described for purposes of illustrating the present methods and systems and is not intended to limit the disclosure to a particular sequence of steps or a particular combination of hardware or software components.

FIG. 13 illustrates a block diagram of a distributed system in which aspects of the disclosure may be practiced. The system includes a general computing device 1304 (e.g., a desktop computer), a tablet computing device 1306, and/or a mobile computing device 1308. The general computing device 1304, the tablet computing device 1306, and the mobile computing device 1308 can each include the components, or be connected to the components, that are shown associated with the electronic device 1100 in FIG. 11 or the mobile electronic device 1200 in FIGS. 12A-12B.

The general computing device 1304, the tablet computing device 1306, and the mobile computing device 1308 are each configured to access one or more networks (represented by network 1310) to interact with the focus area application 1312 (e.g., focus analyzer application and focus updater application) stored in one or more storage devices (represented by storage device 1314) and executed on one or more server computing devices (represented by server computing device 1316). In some aspects, the server computing device 1316 can access and/or receive various types of services, communications, documents and information transmitted from other sources, such as a web portal 1318, an electronic communications services 1320, directory services 1322, instant messaging and/or text services 1324, and/or social networking services 1326. In some instances, these sources may provide robust reporting, analytics, data compilation and/or storage service, etc., whereas other services may provide search engines or other access to data and information, images, graphics, videos, document processing and the like.

As should be appreciated, FIG. 13 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, GUIs, and computer program products according to aspects of the disclosure. As discussed earlier, the operations noted in the blocks may occur out of the order as shown in any flowchart. For example, two blocks shown in succession may in fact be executed substantially concurrently or the blocks may sometimes be executed in the reverse order, depending upon the functionality/acts involved. Additionally, the functionality or elements shown in one GUI can be used in another GUI, and vice versa.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

What is claimed is:

1. A method, comprising:
   determining an endeavor that a user has focused on over a period of time, wherein the endeavor is associated with entities and content items;
   determining relationships between the entities and the content items, wherein the relationships indicate previous interactions between the entities and the content items;
   determining strengths of the relationships based on the previous interactions, wherein the strengths of the relationships represent at least one of a recency of interaction with the content items or a common storage location of two or more of the content items;
   clustering a portion of the entities and the content items into a focus area based on the relationships;
   populating the focus area with focus data associated with the entities and the content items in the focus area based on the strengths of the relationships, wherein the entities and the content items having higher strengths of the relationships are presented more prominently in the focus area than content items having lower strengths of the relationships;
   causing the focus area to be presented; and
   providing one or more updates to the focus data in the focus area that changes the focus data presented in the focus area.

2. The method of claim 1, wherein determining the endeavor that the user has focused on comprises:
   analyzing activity data associated with one or more activities of the user to determine the content items; and
   detecting one or more people associated with the content items to determine the entities.

3. The method of claim 1, further comprising:
   determining a context associated with the user prior to causing the focus area to be presented; and
   determining the user is currently focusing on the focus area based on the context.

4. The method of claim 3, wherein:
   the context is a first context; and
   the method further comprises:
      determining the user is associated with a different second context;
      determining a second focus area the user is currently focusing on based on the second context;
      arranging the focus data for presentation based on the second context;
      causing the second focus area to be presented within the second context; and
      providing one or more updates to the focus data in the second focus area.

5. The method of claim 1, wherein clustering the portion of the entities and the content items into the focus area comprises clustering the entities and the content items into the focus area based on topic modeling that uses the entities as words.

6. The method of claim 1, wherein the content items comprise one or more of communications, documents, tasks, meetings, or projects.

7. The method of claim 1, wherein the strengths of the relationships are further based on a semantic similarity between the content items.

8. The method of claim 1, wherein the strengths of the relationships further represent at least one of:
   a number of activities performed for the content items; or
   a subject matter of the content items.

9. A system, comprising:
   a processing device; and
   a storage device storing instructions, that when executed by the processing device, cause operations to be performed, the operations comprising:
      determining a plurality of endeavors that a user has focused on over a period of time, each endeavor being associated with entities and content items;
      determining relationships between the entities and the content items, wherein the relationships indicate previous interactions between the entities and the content items;
      determining strengths of the relationships based on the previous interactions, the strengths of the relationships representing at least one of a recency of interaction with the content items or a total number of interactions between the entities and the content items;
      clustering the entities and the content items into a plurality of focus areas;
      populating each focus area of the plurality of focus areas with focus data associated with the entities and the content items in that focus area based on the strengths of the relationships, wherein the entities and the content items having higher strengths of the relationships are presented more prominently in the focus area than content items having lower strengths of the relationships;
      causing the plurality of focus areas to be presented; and
      providing one or more updates that modify the focus data in at least one focus area of the plurality of focus areas.

10. The system of claim 9, wherein determining the plurality of endeavors comprises:
    analyzing activity data associated with one or more activities of the user to determine the content items; and
    detecting one or more persons associated with the content items to determine the entities.

11. The system of claim 9, wherein the storage device stores further instructions for:
    determining a context associated with the user prior to causing the plurality of focus areas to be presented; and
    determining the user has worked on each focus data in the plurality of focus areas based on the context.

12. The system of claim 11, wherein:
the context is a first context; and
the storage device stores further instructions for:
- determining the user is associated with a different second context;
- populating the plurality of focus areas with focus data based on the second context;
- arranging the focus data for presentation based on the second context;
- causing the plurality of focus areas to be presented within the second context; and
- repeatedly providing one or more updates to the focus data in at least one focus area.

13. The system of claim 9, wherein providing the one or more updates that modify the focus data in the at least one focus area comprises:
- determining in real-time if an update to the focus data in the at least one focus area is available; and
- providing, when the update is available, the update to the focus data in the at least one focus area.

14. The system of claim 9, wherein causing the plurality of focus areas to be presented comprises providing the plurality of focus areas to be presented in a graphical user interface of a software application such that the plurality of focus areas are arranged in an order of highest relevance to the user to lowest relevance to the user.

15. A method, comprising:
- determining an endeavor that a user has focused on over a period of time, the determining comprising:
  - analyzing activity data associated with one or more activities of the user to determine content items;
  - detecting one or more entities associated with the content items; and
  - determining relationships between the entities and the content items, wherein the relationships indicate previous interactions between the entities and the content items;
- determining strengths of the relationships based on the previous interactions, wherein the strengths of the relationships represent at least one of a recency of interaction with the content items or a relationship strength between the user and an entity;
- clustering some of the entities and the content items into a focus area based on the relationships;
- populating the focus area with focus data associated with the entities and the content items clustered in the focus area based on the strengths of the relationships, wherein the entities and the content items are arranged in the focus area in accordance with the strengths of the relationships; and
- causing the focus area to be presented as a feed such that the focus data in the focus area is updated when updates to the focus data is received.

16. The method of claim 15, further comprising:
- determining a context associated with the user prior to causing the focus area to be presented; and
- determining the user is currently working on the focus data based on the context.

17. The method of claim 1, wherein the focus area includes one or more images of the entities presented in the focus area.

18. The method of claim 17, wherein the one or more images are selectable to present at least one of contact information for an entity or an organizational role for the entity.

19. The method of claim 1, wherein the focus area is presented to the user based on a current context of the user such that the focus area is arranged into a first view when the user is interacting with a first application and the focus area is arranged into a second view when the user is interacting with a second application, the first view being different from the second view.

20. The system of claim 9, wherein each focus area of the plurality of focus areas includes at least one communication by an entity associated with the focus area.

* * * * *